(No Model.) 2 Sheets—Sheet 1.

F. WINDHAUSEN.
APPARATUS FOR PURIFYING AIR AND GAS.

No. 306,040. Patented Sept. 30, 1884.

Attest:
Chas. E. Buckley
Geo. L. Wheelock

Inventor:
Franz Windhausen
By Knight Bros
his Attys.

(No Model.) 2 Sheets—Sheet 2.

F. WINDHAUSEN.
APPARATUS FOR PURIFYING AIR AND GAS.

No. 306,040. Patented Sept. 30, 1884.

Attest:
Chas C Buckley
Geo L Wheelock

Inventor:
Franz Windhausen,
By Knight Bros.
his Attys.

UNITED STATES PATENT OFFICE.

FRANZ WINDHAUSEN, OF BERLIN, GERMANY.

APPARATUS FOR PURIFYING AIR AND GASES.

SPECIFICATION forming part of Letters Patent No. 306,040, dated September 30, 1884.

Application filed September 14, 1883. (No model.)

*To all whom it may concern:*

Be it known that I, FRANZ WINDHAUSEN, engineer, residing in Berlin, Kingdom of Prussia, German Empire, have invented an Improved Apparatus for Purifying Air and Gases, of which the following is a specification.

The object of my invention is to purify air from dust, living organisms, germs thereof, &c., or to free gases, such as are produced in metallurgical and other chemical processes, from substances suspended therein by causing the air or gas to rotate within a layer of water or other liquid, so that the said substances will be projected outward by centrifugal force into the liquid, which thereupon floats them away.

For this purpose the air, which in the following part of this specification is to be understood as including gases, is driven by any suitable means—such as a fan—through the annular space formed by two concentric drums of different diameters inserted one into the other, and rotated with considerable speed, the drums being provided with plates or projections, serving to carry around the air with them. The liquid which is to receive the substances to be separated from the air is introduced either directly or through the inner drum into the outer one, on the wall whereof it spreads out by the rotation of the drum and the action of the centrifugal force, so as to form a layer round about the passing layer or current of air. The liquid is by preference caused to move in a direction opposite to the air-current, and is drawn off at the end of the drum.

The apparatus which I employ for carrying out the invention is represented on the annexed two sheets of drawings in two different arrangements.

Figure 1:
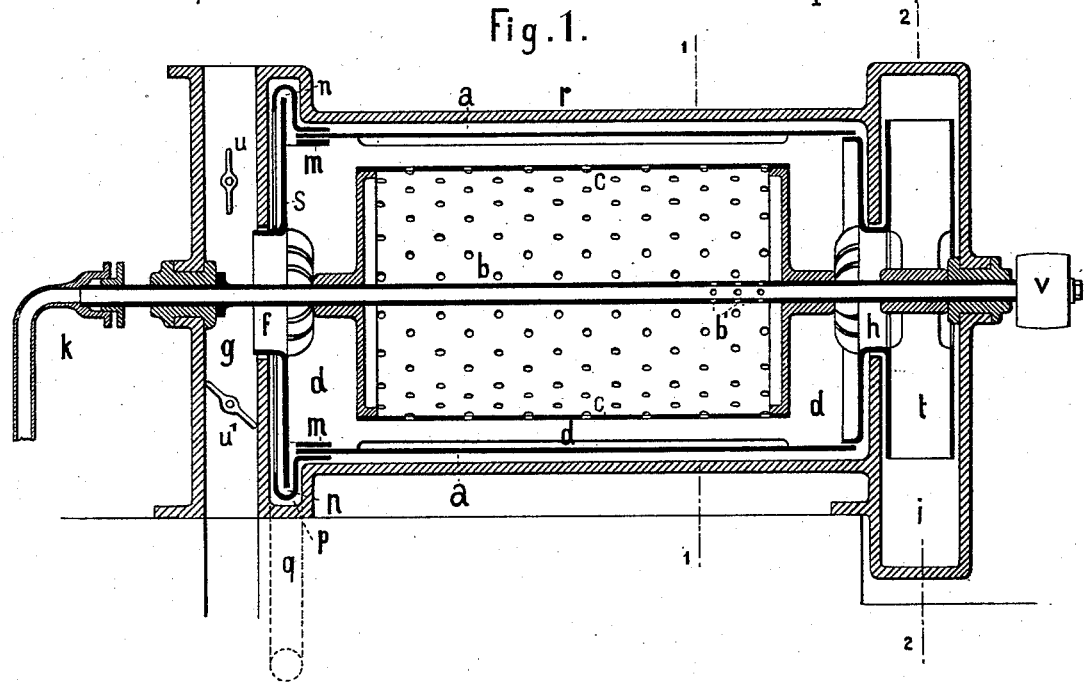
Figure 2:
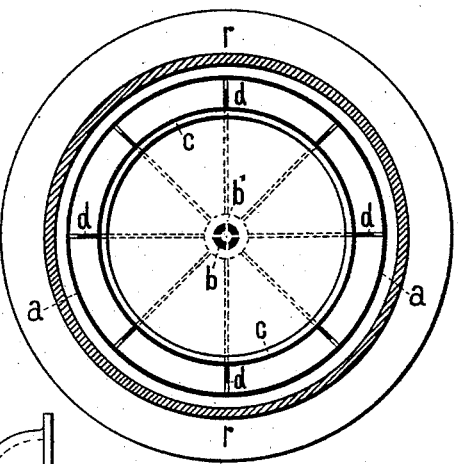
Figure 4:
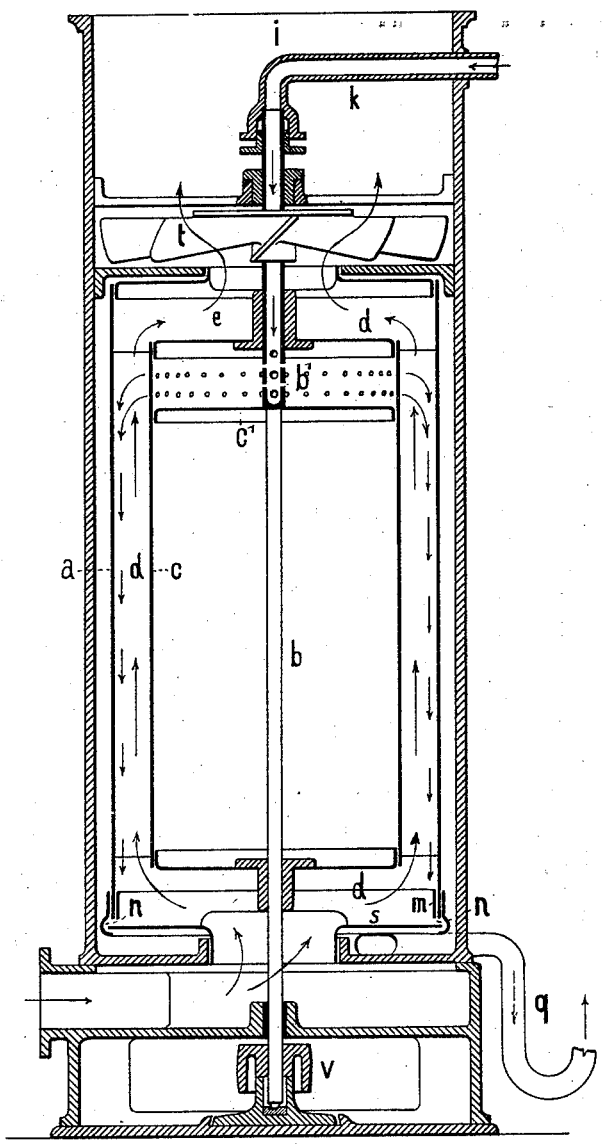
Figure 5:
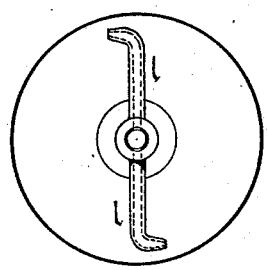
Figure 6:
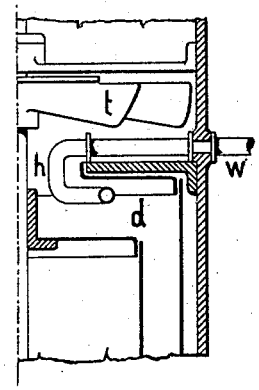

Figure 1 is a longitudinal vertical section of the first arrangement; Fig. 2, a sectional view on line 1 1, and Fig. 3 a like view on line 2 2 of Fig. 1. Fig. 4 shows the second arrangement in vertical section. Figs. 5 and 6 are modifications of parts of the apparatus.

Figure 3:
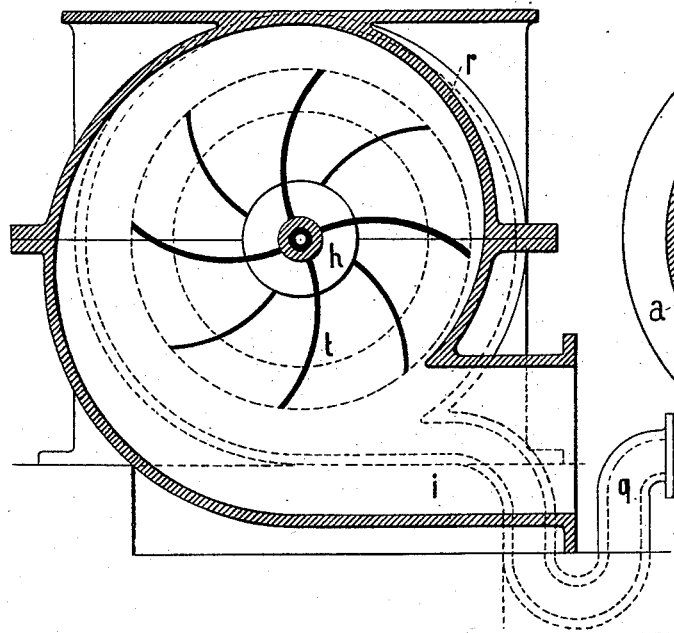

The apparatus, as represented by Figs. 1, 2, and 3, consists of two concentric drums, $a$ and $c$, and a fan, $t$, all fixed on a shaft, $b$, and rotating within a casing, $r$. The outer drum has central openings at $f$ and $h$, through which the fan $t$, when in operation, will draw the air. Instead of a suction-fan, a fan adapted to drive air through the apparatus from its other end may, however, also be used. Besides, the fan may be placed on a separate shaft, if preferred. The air during its passage along the space between the drums is caused to partake of the rotation of the latter by means of plates $d$, arranged within this space. The said plates are placed radially, or nearly so, and they may be straight or curved like the blades of a fan. Moreover, they may extend through the whole space between the drums, leaving, however, by preference, an interval between them and the outer drum for the free circulation of the liquid. This arrangement is shown in Fig. 1; or they are applied upon a part of the two drums only—for instance, at both ends, as in Fig. 4.

The water or other liquid to be used in the purifying process flows from a supply-pipe, $k$, through the shaft $b$, which is made hollow for this purpose, and through the holes $b'$ into the inner drum, $c$. From the said drum, which is perforated upon a part or upon the whole extent of its length, the liquid passes in the form of spray into the outer drum, $a$, where, by virtue of the operating centrifugal force, it spreads out in a uniform layer.

Instead of simply having holes for the passage of the liquid, the shaft $b$ may be provided with the pipes $l$, Fig. 5, which are so curved that they will, by the rotation of the shaft, automatically draw in the liquid. When the latter is to be admitted directly into the space between the two drums, the holes $b'$ are drilled outside of the drum $c$ into the shaft $b$; or a pipe, $w$, Fig. 6, may be introduced between the fan and the drum $a$ into the aperture $h$, as represented in this figure with special reference to the apparatus Fig. 4.

At $n$ the drum $a$ is provided with a flange bent over so as to form an annular channel, into which projects, with a small amount of play, the bottom plate, $s$. Through the slit thus formed between the walls of channel $n$ and plate $s$ the liquid containing the dust, &c., separated from the air is ejected by the action of the centrifugal force into the channel $p$ of the casing $r$, whence it flows off by the siphon-pipe $q$. At the same time the liquid, being in the channel $n$ and surrounding the edge of the plate $s$, constitutes a hydraulic seal, preventing the escape of air by this passage. Instead, however, of forming the channel $n$ on the flange of the drum, it may be on the plate $s$, while the drum has a plain flange projecting into the channel.

In order to keep the layer of liquid in the drum of a certain thickness, the latter is provided with a projecting ring or ledge, $m$, which retains the liquid until it flows over the same.

The shaft $b$ having been put in rotation by a strap running on the pulley $v$, the fan $t$ will suck in air through the aperture $f$ and cause it to pass along the space between the two drums and through the aperture $h$, and thereupon drive the same out through the channel $i$ to the place where it is required. During its passage through the apparatus the air is forced to assume the same rotative speed as the drums by the plates $d$. All particles, being in suspense in the air while it enters, and heavier than the latter, will in consequence be acted upon by centrifugal force and thrown against the wall of the drum $a$. When under these conditions water, brine, or any suitable disinfecting or other liquid is admitted into the apparatus, as described, it will receive all such particles and float them away, while the air leaves the apparatus in purified state.

According to the drawings, the casing $r$ is provided with an entrance-channel, $g$, open at both ends, and provided with two throttle-valves, $u$ and $u'$. This arrangement has been adopted in order that an apparatus for heating or cooling atmospheric air may be put in communication with one end of the said channel, while the other one communicates with the open air.

In Fig. 4 an apparatus of the described kind is shown which is arranged vertically. The drums $a$ and $c$, casing $r$, and plates $d$ are here substantially the same as in the first case. The fan $t$ is supposed to be provided with screw-blades; but it may be like the one shown in Figs. 1 and 2. The purifying-liquid flows through the tubular upper part of the shaft and the holes $b'$ on a plate, $c'$, which conducts it to the perforations in the drum $c$. The liquid, on being thrown against the wall of $a$, flows down along this wall to the channel $n$, there again forming a hydraulic seal, and finally issues by the pipe $q$. The air passing through the apparatus will become impregnated with a certain degree of moisture in the form of vapor, which is ordinarily required when atmospheric air is employed for ventilating inhabited rooms, and when it is previously warmed in a heating apparatus connected with the purifier. On the other hand, the air will not carry along particles of unevaporated water, as the same, even when previously present, are separated out by the action of the centrifugal force. In some cases it is of advantage to heat the purifying-liquid before admitting it into the apparatus.

I claim as my invention—

1. In an apparatus for purifying air or gas from dust, living organisms, and other substances suspended therein, the combination of an imperforate drum or cylinder having suitable means of rotation, means for admitting liquid to the said drum and for spreading it in a continuous sheet upon the interior surface of the same, suitable air or gas supply and exhaust ports, and a centrifugal device within the said drum for projecting the air or gas to be purified against the aforesaid sheet of liquid, and thus depriving it of its solid impurities, substantially as set forth.

2. An apparatus for purifying air or gas, consisting of the rotating drum $a$, having apertures $f$ and $h$, the rotating drum $c$, inclosed in $a$, the plates $d$, the fan $t$, a pipe for admitting liquid into the apparatus, and an opening for allowing the same to run off, all combined substantially as and for the purpose described.

3. The combination, with the drums $a$ and $c$, plates $d$, and fan $t$, of the hollow shaft $b$, provided with holes $b'$ for the passage of liquid into the apparatus, substantially as set forth.

4. The combination, with the drums $a$ and $c$, plates $d$, fan $t$, and pipe for admitting liquid, of the hydraulic-seal channel $n$, substantially as set forth.

5. The combination, with the drums $a$ and $c$, plates $d$, fan $t$, and pipe for admitting liquid, of the projecting ring $m$ in the drum $a$, as specified.

In testimony whereof I have signed my name to this specification in the presence of two subscribing witnesses.

FRANZ WINDHAUSEN.

Witnesses:
 C. ZIMMERMAN,
 G. H. SMITH.